Patented Feb. 16, 1943

2,311,008

UNITED STATES PATENT OFFICE

2,311,008

PROCESS AND COMPOSITION FOR SOFTENING HARD WATER

Nathaniel Beverley Tucker, Glendale, Ohio, assignor to The Procter & Gamble Company, Ivorydale, Ohio, a corporation of Ohio No Drawing. Application June 12, 1939,
Serial No. 278,754

20 Claims. (Cl. 210—23)

This invention relates to the softening of hard water and the lessening of precipitation of soap in hard water and has for its principal object the softening of water without precipitation.

Another object is to increase the efficiency of sudsing, washing, and rinsing operations.

Another object is to reduce the amount of soap or other detergent required for sudsing and cleaning in hard water.

Another object is to prevent deposition of lime soap during rinsing processes.

Soft water is necessary or desirable for many other purposes in connection with the use of soap, such as for example, the prevention of precipitation on fabrics, hair, glass ware, etc., during washing or during the subsequent rinsing operation, the prevention of formation of a ring of dirt around the wash basin, bath tub, etc., and the prevention of spots on clothes, or uneven application of dyes in dyeing operations; also for some purposes where soap is not used, such as the prevention of scale in steam boilers, etc.

In referring to water or "hard water" in this specification, I mean a grade of water suitable, aside from the presence of hardness constituents, for laundry, or domestic, or steam boiler uses, which is substantially neutral or slightly alkaline, and in any event does not contain noticeable quantities of free mineral acids. It is further intended that liquids containing such water, for example dye baths or other solutions, shall be referred to herein for convenience simply as "water." The term "soap" as used herein, unless otherwise qualified, means any soap suitable for detergent purposes.

The precipitation of soap by the hardness constituents of water, especially calcium and magnesium, is a cause of great wastefulness in the use of soap. Any soap thus reacted and precipitated is rendered useless as regards sudsing and cleansing action, so that the harder the water, the more soap is wasted in this way, and in some hard waters more soap is thus wasted than is available for actual sudsing and cleansing. The insoluble soaps precipitated by hard water are commonly designated collectively as "lime soap," although actually soaps of magnesium, iron, aluminum and other metals besides calcium may also be present. Hence, any means effective to convert such hardness constituents to another form so as to render the same incapable of reacting with soap is highly desirable and advantageous. The actual removal of the hardness constituents can be accomplished by precipitating them with suitable chemical reagents and filtering, or by the well-known "zeolite" base exchange process, without filtering. The water can also be freed from these constituents by distillation. These procedures, however, are expensive in operation and require considerable equipment and supervision. Therefore, various attempts have been made to find other means of preventing the reaction between ordinary soaps and the hardness constituents of water without actually removing these constituents from solution in the water. For this purpose the use of sodium metaphosphate and sodium pyrophosphate has been proposed, but as far as I am aware, no one has previously discovered the effectivenes of salts of certain organic acids for this purpose.

In my copending application Serial No. 84,009, filed June 6, 1936, now matured into Patent 2,264,103, granted November 25, 1941, I have explained that the efficiency of soap in hard water can be increased, and precipitation lessened or prevented, by addition to the water of soluble salts of organic acids containing three or more carboxyl groups per molecule. By soluble salts I mean salts of these acids with either organic or inorganic bases which are soluble in water at 20° C. to the extent of one-half percent or more. Some examples of polycarboxylic acids recited in my prior application are citric acid, acetyl citric acid, tricarballylic acid, aconitic acd, mellitic acid, the tetracarboxylic acid prepared from ethyl chloracetate by the malonic ester synthesis, and the pentacarboxylic acid prepared from ethyl aconitate by the malonic ester synthesis. Only a few organic acids containing four or more carboxyl groups per molecule are well-known, but I have prepared several such acids containing four, five, and six carboxyl groups respectively, and have found that their soluble salts in all cases are effective in my process. I have also found that polycarboxylic acids having substituted groups, especially the hydroxyl group, are also effective and in many cases even superior to the corresponding unsubstituted acids.

The present application is especially directed to a special group of the previously mentioned water soluble salts of aliphatic polycarboxylic acids containing three or more carboxyl groups per molecule, but containing also ether groupings in each molecule; these compounds have same advantageous properties. The compounds of this group may be prepared by the well-known process of etherifying polyhydroxy substances such as carbohydrates (starch, sugars, gums, and the like) or polyhydric alcohols (such as glycerol, sorbitol, mannitol, xylitol, etc.) or polyhydroxy acids (such as gluconic acid) by reacting the polyhydroxy substance with at least three mols of a low molecular weight, water-soluble α-halogenated aliphatic acid in the presence of acid-binding agents (such as caustic alkalis, sodium carbonate, etc.). The reaction may be illustrated by the following equation, indicating the reaction of sorbitol with chloracetic acid.

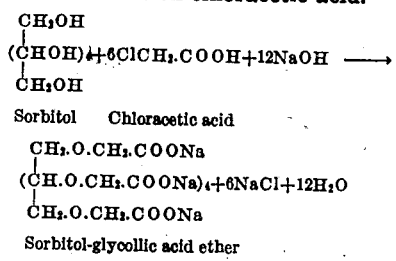

Sorbitol   Chloracetic acid

Sorbitol-glycollic acid ether

Following is an example showing the method of preparing compounds of this class.

*Example 1.*—Sorbitol is stirred in aqueous solution with about six molecular equivalents of chloracetic acid in the presence of excess sodium hydroxide, at room temperature or at the temperature of the steam bath. The homogeneous solution is then adjusted to the desired pH by the addition of acid or of the alkali originally used as required.

The solution thus made contains as its essential constituents, the sodium salts of polycarboxylic acids consisting of polyglycollic acid ethers of sorbitol. These polycarboxylic acids are, in this case, compounds in which an acetic acid residue replaces the hydrogen atom of several of the sorbitol hydroxyl groups, the α-carbon atom of the acetic acid residue being then joined through an ether linkage to the sorbitol residue. It is not necessary for the purposes of the present invention that all of the hydroxyl groups of the sorbitol or corresponding material enter into the reaction as long as at least three of such groups react.

Other compounds of this type may be prepared in a similar manner with other carbohydrates, polyhydric alcohols, or polyhydroxy acids containing three or more hydroxy groups and any low molecular water-soluble α-halogenated aliphatic acid. The low molecular acids suitable for preparing these compounds contain not more than four carbon atoms per molecule. Other acid binding agents than sodium hydroxide may also be used.

In referring to the molecule of polymeric carbohydrates it is to be understood that I refer to the composition of the so-called "structural unit." For example, the structural unit of starch is the glucose residue $C_6H_{10}O_5$. See, for example, "The Chemistry of Organic Compounds," James Bryant Conant, published by McMillan Company, 1933, page 319, or "The Carbohydrates," Armstrong and Armstrong, pages 205 et seq.

Polycarboxylic acid ethers of this type have been prepared from a considerable number of carbohydrate materials including starch, sorbitol, mannitol, and also from gluconic acid, and in all cases the products are found to have the property previously described as common to the soluble salts of all carboxylic acids containing three or more carboxyl groups per molecule, of reducing the amount of soap required to form a suds in hard water. This is believed to be due to their property of softening the water by sequestering the alkaline-earth-metal ions which are always present in hard water.

The soluble salts of the above mentioned group of acids with any of the alkali metals may readily be made by using the hydroxide of potassium or other alkali metal if desired in place of sodium hydroxide as used in the above example. Corresponding salts of the alkaline earth metals may likewise be made directly, using, for example, milk of lime where the calcium salt is desired, in place of a solution of sodium hydroxide. The corresponding salts of ammonium and organic nitrogen bases such as ethylene diamine, triethanolamine and mono-amylamine, etc., may likewise be prepared by first forming the calcium compound using milk of lime in place of sodium hydroxide solution, and then reacting the product with a solution of the sulfate of ammonium or of the desired organic nitrogen base. The calcium is then precipitated as sulfate, leaving in solution the compound of the polycarboxylic glycollic ether acid with the desired base consisting of ammonium or an organic nitrogen base.

When using these salts in conjunction with soap, the pH value of the solution should be so adjusted that decomposition of soap to precipitate acid soap is precluded. It is not always necessary, therefore, to have the stoichiometrical amount of base present in the final solution equivalent to all of the carboxyl groups.

The pH value of soap solutions below which acid soap may precipitate varies greatly with certain factors such as the nature of the fatty acids in the soap, the temperature and concentration of the soap solution and the presence of other electrolytes. This variation is readily shown by the following figures which I have calculated from data given in Uber die Existenz und die Natur der sauren Seifen by P. Eckwall (phys.-Chem. Inst., Akademie Åbo, Finnland), Kolloid-Zeitschrift 80; 77–100 (1937), page 90.

| | pH |
|---|---|
| Na laurate, $4 \times 10^{-7}$ N | 7.6 |
| Na myristate, $2 \times 10^{-6}$ N | 8.3 |
| Na palmitate, $7 \times 10^{-6}$ N | 8.8 |
| Na stearate, $3 \times 10^{-5}$ N | 9.5 |

In these cases a pH value in the solution of 7.6 to 9.5 in the different cases would permit the precipitation of acid soaps. The essential point in the present invention is that the pH value of the solution containing the soap and my reagent shall not be below the value at which acid soap will precipitate, under the conditions existing in each case.

As illustration of the ability of these compounds to reduce the amount of soap required to form a suds in hard water, the following table, No. I, is given. This shows the number of cubic centimeters of a standard soap solution required to titrate to sudsing 50 c. c. of a hard water containing various amounts of sodium salts of various polycarboxylic glycollic ether acids as indicated. The concentration of the said salt, or softener, is calculated on the assumption that the reaction in the preparation of the various products, as indicated in the above equation for sorbitol, is carried to completion.

(The concentration of the standard soap solution used in these tests was such that 12 c. c. were required to produce a suds in 50 c. c. of the water having a hardness equivalent to 15 grains of calcium carbonate per gallon of water.)

*Table I*

| Concentration of softener | 0.0 | .1% | .2% | .5% | 1.0% |
|---|---|---|---|---|---|
| Softener made from— | Cc. | Cc. | Cc. | Cc. | Cc. |
| Starch | 12.0 | 10.2 | 7.9 | 5.5 | 4.1 |
| Mannitol | 12.0 |  | 8.5 | 7.8 | 5.8 |
| Sorbitol | 12.0 | 9.5 | 7.5 | 7.7 | 5.2 |

It will be noted from the above that in all cases the amount of soap required is less in the presence of any of the products tested than in a blank test with no added softener and the reduction of soap is progressive as the amount of softener increases.

Further tests have been made in a standard apparatus and method for testing the efficiency of soaps in hard water under practical operating conditions, which confirmed the laboratory tests above mentioned in showing that the amount of soap required to produce a suds was notably reduced in the presence of the above mentioned reagents.

Hard water when treated with any of the above mentioned reagents is softened without forming a precipitate, and the water thus softened is neutral or slightly alkaline in reaction, has a pH value which can be controlled within reasonable limits, is mild in its action on the skin, fabrics and painted surfaces, and possesses a considerable solvent power for lime soap.

In carrying out my process I may merely add to the hard water, or to the solution of soap in hard water, a sufficient quantity of one of my reagents selected from the group mentioned.

By a "sufficient quantity" I mean enough to render the water suitable for its intended purposes. This may be judged by various means, such as soap titration, observation of the clarity of the solution, or by a practical trial of the softened water for its intended purpose. A complete softening, although sometimes desirable, is in many cases not necessary.

Another important application of my invention is in the saving of soap in laundering operations. The soap concentration in solutions for laundering is usually very low, such as about .2% to .5%, for example, but when made with hard water a considerable proportion of the soap used may be precipitated by the hardness constituents before enough soap becomes available to exert the desired sudsing and cleansing effect. The use of my reagents in such solutions lessens, or even prevents, the precipitation of soap, so that a reduced quantity of soap suffices to produce the required sudsing in hard water, thus making important savings in the amount of soap required. It is well known that sudsing is considered an essential preliminary to cleansing in laundering operations and is the laundryman's usual criterion of the amount of soap to use. Experience has led him to expect little cleansing effect until he has added enough soap to the water to produce a satisfactory suds.

In rinsing baths after laundering with soap, my reagent is also of valuable assistance because when added to hard water used for rinsing it reduces or prevents the precipitation on the garments of soap remaining from the previous washing bath. Other rinse operations where a water softened by my procedure can be used to advantage are, for example, the rinsing of the hair after washing with soap, rinsing of dairy milk bottles, other glassware and dishes, etc.

Similarly in other operations where a wetting effect is required, such as in dyeing, the use of my reagent is of value in preventing precipitation of soap used for its wetting properties.

Some other uses of water thus softened are, for example, in the canning industry, in cooling the hot cans by immersion in water where ordinary hard water gives a dull appearance to the cans due to precipitation of lime; in the manufacture of artificial ice; in the use of water in steam boilers and feed lines to same, and in hot water distributing systems; in all these cases a water thus softened has many advantages over hard water.

My reagents can be used for softening water not only for use with soap but with any cleansing, wetting, sudsing, and emulsifying agent, such as for example the various forms of sulfated alcohols and sulfonated detergents now quite commonly used as soap substitutes. These detergents, while effective in their detergent properties without causing cloudiness in water of ordinary degrees of hardness, can be used effectively in water of much higher degrees of hardness than ordinary without causing cloudiness if the water is softened by one of my reagents. Some examples of these detergents which may be used are sodium lauryl sulfate, sodium oleyl sulfate, sodium oleyl sulfonate, sodium lauryl sulfonate, sodium lauryl sulfoacetate, sodium oleyl isethionate, sodium alkyl benzene sulfonates, secondary alkyl sulfates from petroleum sources, the oleic acid amide of sodium tauride, as well as other compounds of these various groups having detergent properties. The base may, of course, consist of other materials than sodium if desired.

*Example 2.*—The value of these salts in rinsing water is shown in this example. Glass plates were first washed in a .4% solution of sodium tallow soap in hard water having a hardness of 25 grains. They were then rinsed in 25 grain hard water, some with and some without the addition of one of my reagents as a rinsing aid to the water. The plates were then individually compared with a similar clean glass plate which had been washed with soap in distilled water, rinsed with distilled water, and wiped dry with a clean cloth, to determine the relative amount of light transmitted after the respective treatments as measured by means of a transmission photoelectric apparatus. The figures below show in terms of micro-amperes, as given by the photoelectric cell, the difference between the light transmission of a clean plate and that of the washed and rinsed plate in each case. The higher numbers indicate a greater difference in transmission between the clean plate and the washed and rinsed plate, and thus indicate a greater deposition of lime soap or other material on the glass. All the plates were first washed in a .4% sodium tallow soap, as previously mentioned and then rinsed at 80° C. as follows.

| | Difference |
|---|---|
| Hard water at 25 grains hardness | 47 |
| Hard water at 25 grains hardness+.2% sodium citrate | 27 |
| Hard water at 25 grains hardness+.5% sodium citrate | 13 |
| Hard water at 25 grains hardness+.8% sodium citrate | 6 |
| Hard water at 25 grains hardness+.2% ethylene diammonium citrate | 28 |
| Hard water at 25 grains hardness+.8% ethylene diammonium citrate | 3 |

These figures clearly show the greatly reduced amount of deposit on the glass when rinsed with hard water containing varying percentages of some of my reagents. The examples shown are typical, and similar results are obtained with other salts derived from other bases and other acids in the group previously described, such as the sodium salt of the sorbitol-glycollic acid ether previously described.

The effect of these reagents on the use of different soaps in hard water varies in degree, but I find the effect especially pronounced and valuable in the case of soaps made of coconut oil in whole or in part.

I believe the reason for the peculiar action of these reagents in lessening the precipitation of soap in hard water is that the ions of these organic acids having three or more carboxyl groups per molecule tend to unite with alkaline earth and/or heavy metal ions in such a way as to form slightly dissociated complex ions, thereby decreasing the activity of the alkaline earth and/or metal ions.

My reagents are also suitable and effective for use as builders in connection with soaps or other organic detergent substances, such as for example the soluble salts of sulfuric esters of higher aliphatic alcohols and the soluble salts of sulfonated alcohols, hydrocarbons and other similar substances having detergent properties. In such cases my reagents may be mixed with the detergent in suitable proportions before use, or they may be added to the water with the detergent. Regardless of the nature of the detergent itself, and even with the use of the above mentioned classes of organic detergents as well as with ordinary soap, these reagents are found to assist the action of the detergent itself and thus they reduce the amount of detergent required. They act therefore as true builders with detergents, although substantially devoid of detergent power themselves.

In using these reagents, the minimum required for complete effectiveness can readily be determined by experiment. This minimum in each case will depend on the hardness of the water, the concentration of soap, the kind of soap used, the nature of the organic acid containing three or more carboxyl groups per molecule, the base used with such organic acid, and the temperature. However, any of the salts in the group mentioned, even in proportions below that required for complete effectiveness, will have an effect in at least partly clarifying concentrated solutions of soap, or in reducing the amount of soap required for sudsing in solutions of low concentration such as are used in laundering, or in decreasing the formation of a scum of lime soap or a ring around the tube when the salt is added to the tub or basin of water used for bathing or for shampooing the hair, or in lessening the precipitation of lime soap on the skin, hair, fabrics, glassware, or other materials washed and rinsed in hard water.

These salts can also be used advantageously in conjunction with the more common alkaline soap builders such as soda ash, sodium silicate, trisodium phosphate, etc.

Having thus described the invention, what is claimed as new and desired to be secured by Letters Patent is:

1. The process of softening hard water without causing a precipitate, which comprises adding to said water a water-soluble salt derived from a polyglycollic acid ether of an aliphatic polyhydroxy substance selected from the group consisting of carbohydrates, polyhydric alcohols and polyhydroxy carboxylic acids, and a base selected from the group consisting of alkali-metal bases, ammonia, and organic nitrogen bases, said polyglycollic acid ether containing at least three carboxyl groups per molecule.

2. The process of reducing the amount of soap required for washing in hard water which comprises adding to said water a water-soluble salt derived from a polyglycollic acid ether of an aliphatic polyhydroxy substance selected from the group consisting of carbohydrates, polyhydric alcohols and polyhydroxy carboxylic acids, and a base selected from the group consisting of alkali-metal bases, ammonia, and organic nitrogen bases, said polyglycollic acid ether containing at least three carboxyl groups per molecule, the pH value of said salt in solution being sufficiently great to prevent the precipitation of acid soap.

3. The process of reducing the deposition of lime soaps in rinsing a substance in hard water following the use of soap in washing said substance which comprises adding to the rinse water a sufficient quantity of a water soluble salt derived from a polyglycollic acid ether of an aliphatic polyhydroxy substance selected from the group consisting of carbohydrates, polyhydric alcohols and polyhydroxy carboxylic acids, and a base selected from the group consisting of alkali-metal bases, ammonia, and organic nitrogen bases, said polyglycollic acid ether containing at least three carboxyl groups per molecule, the pH value of said salt in solution being sufficiently great to prevent the precipitation of acid soap and rinsing said substance.

4. A detergent composition for sudsing and washing in hard water comprising a water soluble organic detergent substance and a builder substantially devoid of detergent properties but capable of improving the efficiency of an organic detergent in hard water and capable of softening water without causing a precipitate, said builder comprising a water soluble salt derived from a polyglycollic acid ether of an aliphatic polyhydroxy substance selected from the group consisting of carbohydrates, polyhydric alcohols and polyhydroxy carboxylic acids, and a base selected from the group consisting of alkali-metal bases, ammonia, and organic nitrogen bases, said polyglycollic acid ether containing at least three carboxyl groups per molecule, the pH value of said salt in solution being sufficiently great to prevent the precipitation of acid soap when used in conjunction with a soap detergent in solution.

5. A detergent composition for sudsing and washing in hard water comprising a water soluble detergent soap and a builder substantially devoid of detergent properties but capable of improving the efficiency of soap in hard water and capable of softening water without causing a precipitate, said builder comprising a water soluble salt derived from a polyglycollic acid ether of an aliphatic polyhydroxy substance selected from the group consisting of carbohydrates, polyhydric alcohols and polyhydroxy carboxylic acids, and a base selected from the group consisting of alkali-metal bases, ammonia, and organic nitrogen bases, said polyglycollic acid ether containing at least three carboxyl groups per molecule, the pH value of said salt in solution being sufficiently great to prevent the precipitation of acid soap when used in conjunction with a soap detergent in solution.

6. A detergent composition for sudsing, washing and rinsing in hard water comprising a water soluble salt of a sulfuric ester of a higher aliphatic alcohol having detergent properties and a builder substantially devoid of detergent properties but capable of improving the efficiency of a soluble salt of a sulfuric ester of a higher aliphatic alcohol in hard water and capable of softening water without causing a precipitate, said builder comprising a water soluble salt derived from a polyglycollic acid ether of an aliphatic polyhydroxy substance selected from the group consisting of carbohydrates, polyhydric alcohols and polyhydroxy carboxylic acids, and a base selected from the group consisting of alkali-metal bases, ammonia, and organic nitrogen bases, said polyglycollic acid ether containing at least three carboxyl groups per molecule.

7. A detergent composition for sudsing, washing and rinsing in hard water comprising a water soluble salt of a sulfonated hydrocarbon having detergent properties and a builder substantially devoid of detergent properties but capable of improving the efficiency of a soluble salt of a sulfonated hydrocarbon in hard water and capable of softening water without causing a precipitate, said builder comprising a water soluble salt derived from a polyglycollic acid ether of an aliphatic polyhydroxy substance selected from the group consisting of carbohydrates, polyhydric alcohols and polyhydroxy carboxylic acids, and a base selected from the group consisting of alkali-metal bases, ammonia, and organic nitrogen bases, said polyglycollic acid ether containing at least three carboxyl groups per molecule.

8. The process of softening hard water without causing a precipitate, which comprises adding to said water a water soluble salt of the reaction product of an aliphatic polyhydroxy substance containing at least three hydroxyl groups per molecule and selected from the group consisting of carbohydrates, polyhydric alcohols, and polyhydroxy carboxylic acids with at least three mols of a low molecular weight water soluble α-monohalogenated aliphatic acid in the presence of an acid neutralizing agent.

9. The process of reducing the amount of soap required for washing in hard water which comprises adding to said water a water soluble salt of the reaction product of an aliphatic polyhydroxy substance containing at least three hydroxyl groups per molecule and selected from the group consisting of carbohydrates, polyhydric alcohols, and polyhydroxy carboxylic acids with at least three mols of a low molecular weight water soluble α-monohalogenated aliphatic acid in the presence of an acid neutralizing agent, the pH value of said salt in solution being sufficiently great to prevent the precipitation of acid soap.

10. The process of reducing the deposition of lime soaps in rinsing a substance in hard water following the use of soap in washing said substance which comprises adding to the rinse water a sufficient quantity of a water soluble salt of the reaction product of an aliphatic polyhydroxy substance containing at least three hydroxyl groups per molecule and selected from the group consisting of carbohydrates, polyhydric alcohols, and polyhydroxy carboxylic acids with at least three mols of a low molecular weight water soluble α-monohalogenated aliphatic acid in the presence of an acid neutralizing agent, the pH value of said salt in solution being sufficiently great to prevent the precipitation of acid soap and rinsing said substance.

11. A detergent composition for sudsing and washing in hard water comprising a water soluble organic detergent substance and a builder substantially devoid of detergent properties but capable of improving the efficiency of an organic detergent in hard water and capable of softening water without causing a precipitate, said builder comprising a water soluble salt of the reaction product of an aliphatic polyhydroxy substance containing at least three hydroxyl groups per molecule and selected from the group consisting of carbohydrates, polyhydric alcohols, and polyhydroxy carboxylic acids with at least three mols of a low molecular weight water soluble α-monohalogenated aliphatic acid in the presence of an acid neutralizing agent, the pH value of said salt in solution being sufficiently great to prevent the precipitation of acid soap when used in conjunction with a soap detergent in solution.

12. A detergent composition for sudsing and washing in hard water comprising a water soluble detergent soap and a builder substantially devoid of detergent properties but capable of improving the efficiency of soap in hard water and capable of softening water without causing a precipitate, said builder comprising a water soluble salt of the reaction product of an aliphatic polyhydroxy substance containing at least three hydroxyl groups per molecule and selected from the group consisting of carbohydrates, polyhydric alcohols, and polyhydroxy carboxylic acids with at least three mols of a low molecular weight water soluble α-monohalogenated aliphatic acid in the presence of an acid neutralizing agent, the pH value of said salt in solution being sufficiently great to prevent the precipitation of acid soap when used in conjunction with a soap detergent in solution.

13. A detergent composition for sudsing, washing and rinsing in hard water comprising a water soluble salt of a sulfuric ester of a higher aliphatic alcohol having detergent properties and a builder substantially devoid of detergent properties but capable of improving the efficiency of a soluble salt of a sulfuric ester of a higher aliphatic alcohol in hard water and capable of softening water without causing a precipitate, said builder comprising a water soluble salt of the reaction product of an aliphatic polyhydroxy substance containing at least three hydroxyl groups per molecule and selected from the group consisting of carbohydrates, polyhydric alcohols, and polyhydroxy carboxylic acids with at least three mols of a low molecular weight water soluble α-monohalogenated aliphatic acid in the presence of an acid neutralizing agent.

14. A detergent composition for sudsing, washing and rinsing in hard water comprising a water soluble salt of a sulfonated hydrocarbon having detergent properties and a builder substantially devoid of detergent properties but capable of improving the efficiency of a soluble salt of a sulfonated hydrocarbon in hard water and capable of softening water without causing a precipitate, said builder comprising a water soluble salt of the reaction product of an aliphatic polyhydroxy substance containing at least three hydroxyl groups per molecule and selected from the group consisting of carbohydrates, polyhydric alcohols, and polyhydroxy carboxylic acids with at least three mols of a low molecular weight water soluble α-monohalogenated aliphatic acid in the presence of an acid neutralizing agent.

15. The process of softening hard water without causing a precipitate, which comprises adding to said water a water-soluble salt of the reaction product of a water dispersible carbohydrate containing at least three hydroxyl groups per molecule and a water-soluble alpha-monohalogenated aliphatic acid having not more than four carbon atoms per molecule in the presence of an acid neutralizing agent, the mol ratio of the halogenated acid to the carbohydrate being at least 3:1.

16. The process of softening hard water without causing a precipitate, which comprises adding to said water a water-soluble salt of the reaction product of an aliphatic polyhydric alcohol containing at least three hydroxyl groups per molecule and a water-soluble alpha-monohalogenated aliphatic acid having not more than four carbon atoms per molecule in the presence of an acid neutralizing agent, the mol ratio of the halogenated acid to the polyhydric alcohol being at least 3:1.

17. The process of softening hard water without causing a precipitate, which comprises adding to said water a water-soluble salt of the reaction product of an aliphatic polyhydroxy carboxylic acid containing at least three hydroxyl groups per molecule and a water-soluble alpha-monohalogenated aliphatic acid having not more than four carbon atoms per molecule in the presence of an acid neutralizing agent, the mol ratio of the halogenated acid to the polyhydroxy acid being at least 3:1.

18. A detergent composition for sudsing and washing in hard water comprising a water soluble organic detergent substance and a builder substantially devoid of detergent properties but capable of improving the efficiency of an organic detergent in hard water and capable of softening water without causing a precipitate, said builder comprising as the essential ingredient a water soluble salt derived from a polyglycolic acid ether of a water dispersible carbohydrate containing at least three hydroxyl groups per molecule and a base selected from the group consisting of alkali metal bases, ammonia, and organic nitrogen bases, said polyglycolic ether containing at least three carboxylic groups per molecule, and the pH value of said salt in solution being sufficiently great to prevent the precipitation of acid soap when used in conjunction with a soap detergent in solution.

19. A detergent composition for sudsing and washing in hard water comprising a water soluble organic detergent substance and a builder substantially devoid of detergent properties but capable of improving the efficiency of an organic detergent in hard water and capable of softening water without causing a precipitate, said builder comprising as the essential ingredient a water soluble salt derived from a polyglycolic acid ether of an aliphatic polyhydric alcohol containing at least three hydroxyl groups per molecule, and a base selected from the group consisting of alkali metal bases, ammonia, and organic nitrogen bases, said polyglycolic acid ether containing at least three carboxyl groups per molecule, and the pH value of said salt in solution being sufficiently great to prevent the precipitation of acid soap when used in conjunction with a soap detergent in solution.

20. A detergent composition for sudsing and washing in hard water comprising a water soluble organic detergent substance and a builder substantially devoid of detergent properties but capable of improving the efficiency of an organic detergent in hard water and capable of softening water without causing a precipitate, said builder comprising as the essential ingredient a water soluble salt derived from a polyglycolic acid ether of an aliphatic polyhydroxy carboxylic acid having at least three hydroxyl groups per molecule, and a base selected from the group consisting of alkali metal bases, ammonia, and organic nitrogen bases, said polyglycolic ether containing at least three carboxylic groups per molecule, and the pH value of said salt in solution being sufficiently great to prevent the precipitation of acid soap when used in conjunction with a soap detergent in solution.

NATHANIEL BEVERLEY TUCKER.